(12) United States Patent
Guillemette et al.

(10) Patent No.: US 6,692,804 B1
(45) Date of Patent: Feb. 17, 2004

(54) HIGH STRENGTH EXTRUDED TUBULAR PRODUCT AND METHOD FOR MAKING SAID PRODUCT

(75) Inventors: A Roger Guillemette, West Warwick, RI (US); Richard Guillemette, West Warwick, RI (US)

(73) Assignee: Guill Tool & Engineering Co., Inc., West Warwick, RI (US)

( * ) Notice: Subject to any disclaimer, the term of this patent is extended or adjusted under 35 U.S.C. 154(b) by 0 days.

(21) Appl. No.: 09/547,638

(22) Filed: Apr. 12, 2000

Related U.S. Application Data (63) Continuation-in-part of application No. 08/808,512, filed on Feb. 27, 1997, now Pat. No. 5,980,226.
(60) Provisional application No. 60/128,822, filed on Apr. 12, 1999.

(51) Int. Cl.$^7$ .............. B32B 1/00; B32B 1/08; F16L 11/00; F16L 11/04
(52) U.S. Cl. ............ 428/36.9; 428/36.91; 138/137; 138/138; 138/139; 138/140; 138/141
(58) Field of Search .............. 428/36.91, 36.9; 138/137, 138, 139, 140, 141

(56) References Cited

U.S. PATENT DOCUMENTS 3,744,529 A * 7/1973 Jorda et al. ............ 138/125
4,225,547 A * 9/1980 Okita ..................... 264/127
5,156,785 A * 10/1992 Zdrahala ................. 264/108
5,248,305 A * 9/1993 Zdrahala ................. 604/280
5,248,530 A * 9/1993 Jester et al. .............. 428/1
5,505,887 A * 4/1996 Zdrahala ................. 264/127
5,667,818 A * 9/1997 Guillemette ........... 425/133.1

FOREIGN PATENT DOCUMENTS

JP          63-199622        * 8/1988

OTHER PUBLICATIONS

Baird, D.G. et al., "The In–Situ Generation Of Liquid Crystalline Reinforcements In Engineering Thermoplastics", 22 pgs.
Farell, G.W. et al., "A Rotating Annular Die To Control The Biaxial Orientation In Melt Processed Thermotropic Liquid Crystalline Cellulose Derivatives", Journal Of Polymer Engineering, vol. 6, Nos. 1–14, 1986, pp. 263–289.

* cited by examiner

Primary Examiner—William P. Watkins, III
Assistant Examiner—Marc Patterson
(74) Attorney, Agent, or Firm—Perman & Green, LLP (57) ABSTRACT

Using a balanced flow path, multiple layers of extruded plastic are supplied to a chamber having independently rotating surfaces. Said rotating surfaces apply a shear force to at least the inner and outer layers of said extruded plastic to orient said materials in said layers in different helical patterns, thereby forming a multi-layer tubular product in which at least inner and outer layers have different helical patterns to strengthen the product.

5 Claims, 12 Drawing Sheets

HIGH STRENGTH EXTRUDED TUBULAR PRODUCT AND METHOD FOR MAKING SAID PRODUCT

CROSS REFERENCE TO RELATED PATENT APPLICATIONS

This application claims the benefit of U.S. Provisional Application(s) No(s).: 60/128,822 Apr. 12, 1999 which application is a continuation-in-part of copending application(s) application Ser. No. 08/808,512 filed on Feb. 27, 1997 now U.S. Pat. No. 5,980,226 issued on Nov. 9, 1999. U.S. application Ser. No. 08/625,779 now U.S. Pat. No. 5,667,818 issued Sep. 16, 1997 Ser. No. 08/148,009 now abandoned filed on Nov. 5, 1993 Ser. 09/271,537, now abandoned.

BACKGROUND OF THE INVENTION

In certain applications, it is advantageous to extrude plastic tubular products which are of superior strength and rigidity. This allows the plastic tubes to be used where the need for structural support is mandated. It is a purpose of this invention to increase the strength of common tubular plastic products without reliance on expensive, exotic materials, such as liquid crystal polymers, PTFE and like rigid chain polymers. To accomplish this purpose, this invention uses an extrusion die assembly for common thermoplastic materials to provide a rotary motion to the molten plastic material as it is extruded.

Several attempts have been made, in particular in the medical field, to increase strength and rigidity by orienting the extruded material in a helical manner. Such an attempt is illustrated in U.S. Pat. No. 5,156,785 which describes a method by which catheters are constructed from a mixture of liquid crystal polymers and other plastics. Using an extrusion die with rotating components, fibrils of liquid crystal polymer are oriented in a helical pattern in order to construct catheters with greater rotational stiffness. In U.S. Pat. No. 5,248,305, which is related to the '785 patent, a schematic depiction of an extrusion head with rotating components is shown in FIG. 4. It should be noted that there is no description of how the relative rotation of the extrusion die elements, is accomplished. It is a purpose of this invention to construct a reliable system for rotating the opposing surfaces which form an extrusion channel in an extrusion die to preferentially bias the molecular structure of common thermoplastic materials.

The above patents, at least in part, were the result of work relating to improving self reinforcing composites in which the beneficial effects of liquid crystal polymers were employed. Liquid crystal polymers exhibit a rod like polymer chain which has been found to align more readily than flexible chain polymers when subjected to a shear force (D. G. Baird, et al, *The In-Situ Generation of Liquid Crystalline Reinforcements in Engineering Thermoplastics*). This reference seems to teach that flexible chain polymers have constructive results only when blended with liquid crystal polymers. Similarly, in the reference Farell, et al, *A Rotating Annular Die To Control the Biaxial Orientation in Melt Processed Thermotropic Liquid Crystalline Cellulose Derivatives,* only low levels of preferential orientation or a negative effect was experienced when polyethylene was subjected to shear by virtue of a rotating die head. All of the above systems refer to a single extruded layer.

A purpose of this invention is to provide a system for producing a product using common, flexible chain polymers which are applied in at least two layers having different orientations which enhance the strength characteristics of tubular plastic products. In the system shown in Japanese Patent Application No. 63-199622, Aug. 18, 1988, Moulding Method for Multilayer Film, a liquid crystal polymer is blended with a polyester resin in a channel formed by rotating components. No layers are formed as the materials are introduced side by side and therefore mixed in a single layer.

It is the purpose of this invention to combine an extrusion die assembly having a balanced flow passage with rotating die elements. A balanced flow extrusion die passage is described in U.S. Pat. No. 5,667,818, the disclosure of which is incorporated herein by reference.

Another purpose of this invention is to provide a tubular product constructed of multiple layers of extruded common thermoplastic polymers having different helical molecular structures to provide an enhanced strength tubular product.

SUMMARY OF THE INVENTION

A tubular product is constructed with multiple layers of extruded flexible chain polymer. Adjacent layers are subjected to different or opposing shear forces in order to generate differing helical molecular structures in the adjacent layers. The helixes thus formed will be at an angle to each other. The relatively transverse helixes will generate very strong tubular products.

To accomplish this unique structure, the layers of flexible chain polymer material are joined and passed into a restricted annular chamber. The chamber is formed by inner and outer cylindrical surfaces, in which the outer surface is formed on a die module and the inner surface is formed by a tip module. By rotating the modules, these surfaces may be rotated in opposing directions or at a differing relative rotational speed depending on the performance specification desired for the tubular product. The shear forces exerted on the respective layers by the rotating surfaces will induce a spiraling orientation of the polymer in each layer which will be relatively different depending on the direction and speed of the surfaces. The helixes will be oriented at differing angles to a plane transverse to the axis of rotation, analogous to the pitch angle of a screw.

A convenient mechanism for providing the annular shear chamber is also shown in this application. A balanced flow passage is constructed in a series of axially aligned die elements to supply at least two layers of extruded plastic to the shear chamber. In the case of a two layer construction, there will be an inner and outer layer which are directly exposed to the differing shear forces of the rotating surfaces which form the shear chamber. Each of these surfaces are attached to external drive-motors which are independently controlled to provide relative motion between the chamber surfaces. The chamber surfaces are constructed on independent elements of the die assembly which are separately mounted for rotation within the assembly. Appropriate bearing assemblies are provided which can withstand the high temperature environment of the assembly. In addition a specialized sealing system is needed to prevent leakage of the extruded materials.

DESCRIPTION OF THE DRAWING

The preferred embodiment of the invention is described in more detail below with reference to the drawing in which.

DETAILED DESCRIPTION OF THE INVENTION

The Tubular Product

Figure 1:
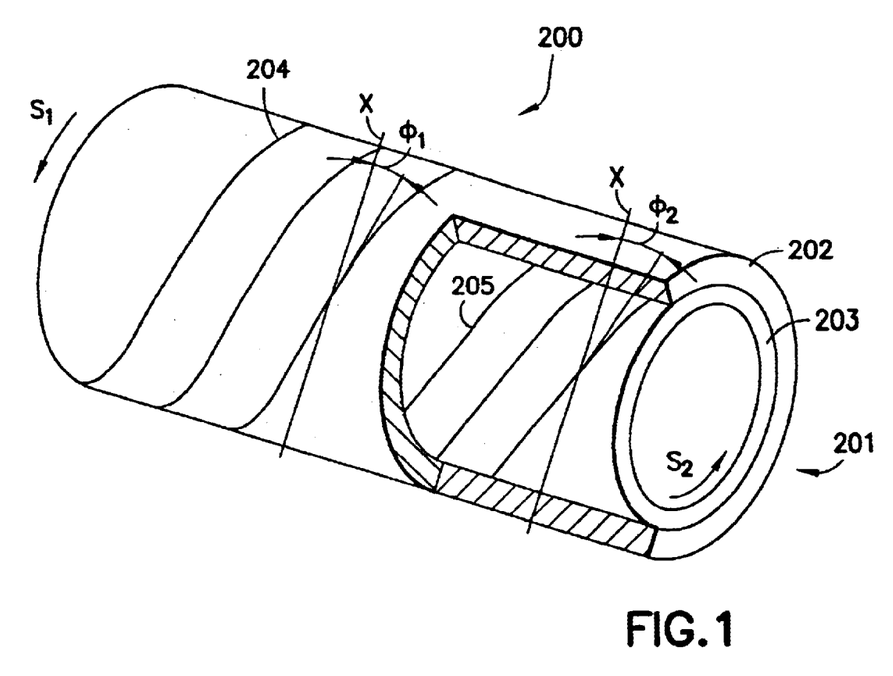
FIG. 1 is a perspective view of the tubular product of this invention.

The high strength tubular product 200 of this invention is shown in FIG. 1. As shown, it is formed of an extrudible plastic material in a generally cylindrical shape having a longitudinal axis 201. The tubular product 200 may be formed by extruding multiple layers using the die systems shown in FIGS. 2, 9 and 14 adapted for rotation as described below with reference to FIGS. 2 through 8. For convenience of illustration a tubular product 200 is shown in FIG. 1 having layers 202 and 203. During the extrusion of the product, layer 202 is subjected to a shear force by an outer rotating surface moving at a rotational speed of $S_1$ and layer 203 is subjected to a shear force by an inner rotating surface moving at a rotational speed of $S_2$. The speeds $S_1$ and $S_2$ are different and can be in opposite directions as well. The speeds may be oscillated to provide a unique alternating orientation. The shear forces will create a helical orientation of the molecular structure of the finished product 200. In the particular example shown, $s_1$ is less than $S_2$ and in the same direction. It should be noted that the rotary drives provide infinitely variable controls and as such will provide a wide spectrum of relative speed variations. As shown in FIG. 1, the molecular structure of layer 202 is substantially aligned with the helix 204 and the molecular structure of layer 203 will be substantially aligned with a helix 205. The helixes 204 and 205 will progress axially along the respective layers at a pitch angle, which is defined, for the purpose of this application, as the angle $\phi$ formed by the intersection of a helix with a plane x perpendicular to the longitudinal axis 201. The angle $\phi$ of the helix depends on the rotational speed S, the longitudinal speed L, the thickness of the layer and other factors. For the purpose of illustration, Helix 204 is shown as having a pitch angle $\phi_1$ and helix 205 is shown as having a pitch angle $\phi_2$. In the example, $\phi_1$ is smaller than $\phi_2$. The use of multiple layers having differing helical orientation provides a superior structural strength to the tubular product 200. It should be noted that the orientation achieved may not be homogeneous, but the above discussions will apply to an average or dominant orientation.

Plastic materials which may be processed in accordance with this invention include well known thermoplastic polymers, including flexible chain polymers, capable of being formed into tubular products by an extrusion thermoforming process. Examples of such polymers include polystyrene and copolymers of styrene with butadiene and acrylonitrite (ABS resins); polyvinylchloride; polyolefins such as polyethylene and polypropylene; polyesters such as polyethylene terephihalate; polyketones; polyamides; thermoplastic elastomers and like polymers. In the normal extrusion process the molecular chains are randomly positioned. These chains are sometimes aligned axially by stretching of the product as it is removed from the die.

The tubular product of this invention is shaped in the extrusion die by combining at least two separate polymer streams to form a composite tubular or cylindrical product having at least two separate layers which may be of the same or different polymer materials. It is also within the scope of the invention that one of said layers is composed of one type of polymer and the other layer(s) composed of a different type of polymer which polymers may or may not be missible with one another.

The tubular product of the invention maybe described as a cylindrical shape wherein the wall portion of the cylinder is composed of at least two separate layers of plastic wherein a substantial number of the molecular-polymer chains in each layer are aligned. Since each layer is subjected to a different shear force, the helical orientation, as represented by angles ($\phi$), will spiral at different angles ($\phi$) with respect to a plane X perpendicular to the longitudinal axis of the cylinder, as described above.

The shear force caused by the rotation of outer surface 228, while in contact with the outer polymer layer, tends to orient a substantial number of the polymer molecules in that outer layer at one average angle $\phi_1$, while the shear caused by rotation of inner surface 229 (rotating at a different speed or in a different direction) while in contact with the inner polymer layer tends to orient a substantial number of the polymer molecules in the inner layer at a different average angle $\phi_2$. A substantial number of the polymer molecules in at least the inner and outer layers of the cylinder wall thus form a helical pattern with each helix forming different angles with respect to plane X. This bimodal orientation of the layers imparts improved stiffness and strength to the tubular product as compared with a conventionally extruded product having a comparable wall thickness. In this manner multiple layers can be built up of different materials to further enhance the strength and usefulness of the resulting product.

The relative thickness of each layer forming composite cylindrical wall is dictated by the relative feed rate of each polymer in the extruder as one layer is laid down on top of another in the extruder die. Generally, each layer may comprise about 10 to 90% of the thickness of the cylinder wall.

The Shear Chamber

Figure 2:
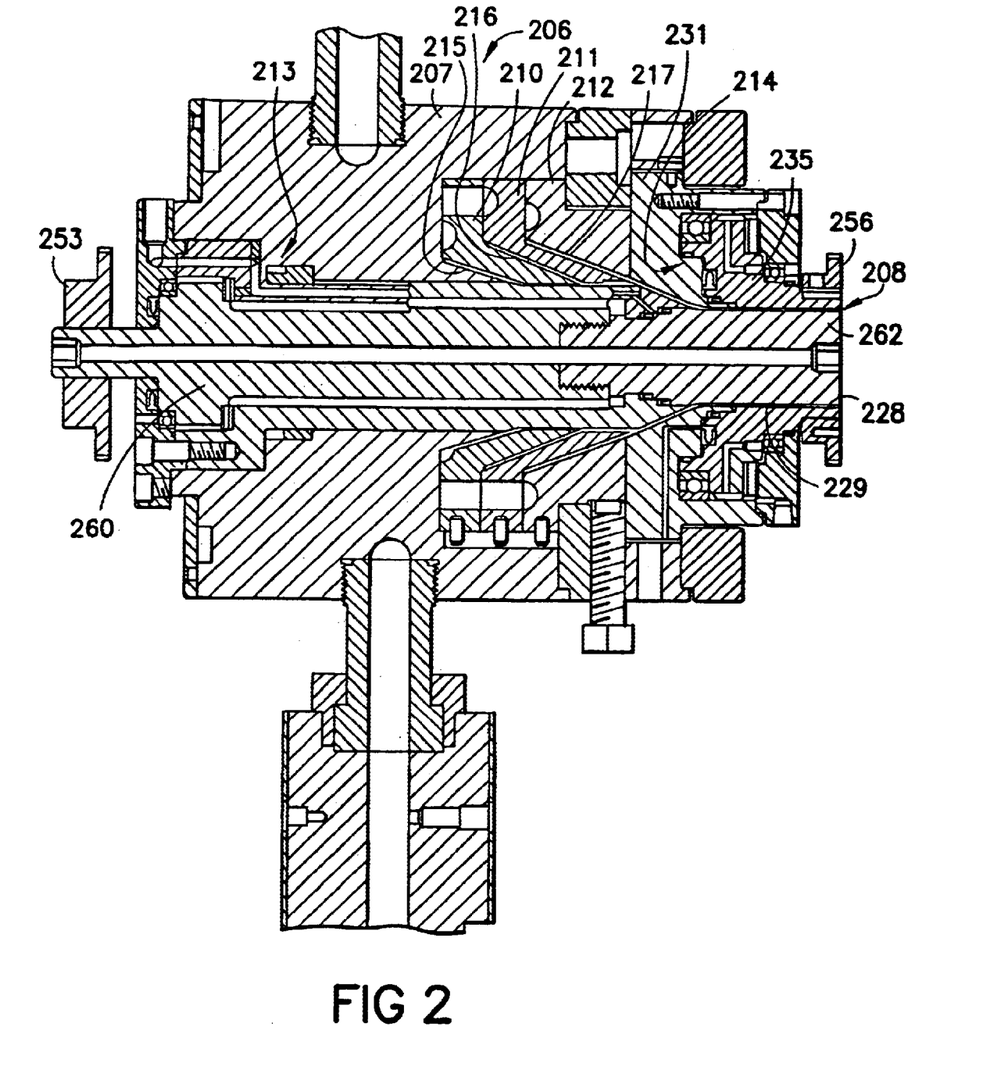
FIG. 2 is a cross sectional view of the extrusion system of this invention.

In order to apply the shear forces required to generate the helical molecular structure, the multi-layered extruded tube 200 is directed, while still molten, to an annular chamber 208 constructed within the extrusion die 206. As shown in FIG. 2, the chamber 208 is defined by the inner surface 229 of the die module 235 and the outer surface 228 of the downstream tip portion 262. By rotating the die module 235 and the tip portion 262, relative movement of the surfaces 228 and 229 may be, obtained. This relative movement will apply the necessary shear forces to the layers of the tube 200 to obtain the desired diverse helical structure. This relative movement may be of an infinite variety of combinations which can be predetermined and programmed into the computer controlled drive for each of the surfaces.

The modules of the extrusion die 206 are constructed and function in a manner as described below under the headings: The Balanced Flow System and the Rotating System. The extrusion die 206 consists of a die body 207, a tip 260/262, tip die modules 210, 211, and 212, and die module 235 assembled in an axially aligned arrangement. The individual modules are nested to cooperate with adjacent modules to provide a balanced flow path for each of the streams of molten plastic used to obtain a multi-layered tubular product.

The tip consists of an upstream portion 260 and a downstream portion 262 connected to form a single structure. The tip portion are mounted within a central bore of the die 206 on bearing blocks 213 and 214. The bearings allow the tip to be rotated by driving transmission gear 253. The details of the drive system are discussed in more detail below.

As shown in FIG. 2, the tip die elements 210, 211, and 212, cooperate to form a portion of a balanced flow path for three annular extrusion channels 215, 216, and 217. This configuration will supply three layers of polymer material to the shear chamber 208. Each of the extrusion channels can be supplied with different materials which can be selected to enhance the affect of the shear forces. Additional layers could be provided as needed for a particular application. In addition an intermediate layer could be used to promote adherence between the outer and inner layers.

Die module 235 is mounted for rotation at the downstream end of the extrusion die within die holder 231. A specialized bearing and seal package is used and is substantially as described below. The die module 235 is driven through the transmission gear 256. Surface 229 of die module 235 forms the outer wall of the shear chamber 208.

The drive system may be powered by infinitely variable electric motors which are independently controlled by a central computer. This allows the rotating components to be driven in a wide range of speeds resulting in an ability to select the optimum relative motion between the surfaces 228 and 229 for a particular end product.

The Rotating System

Figures 3, 6:
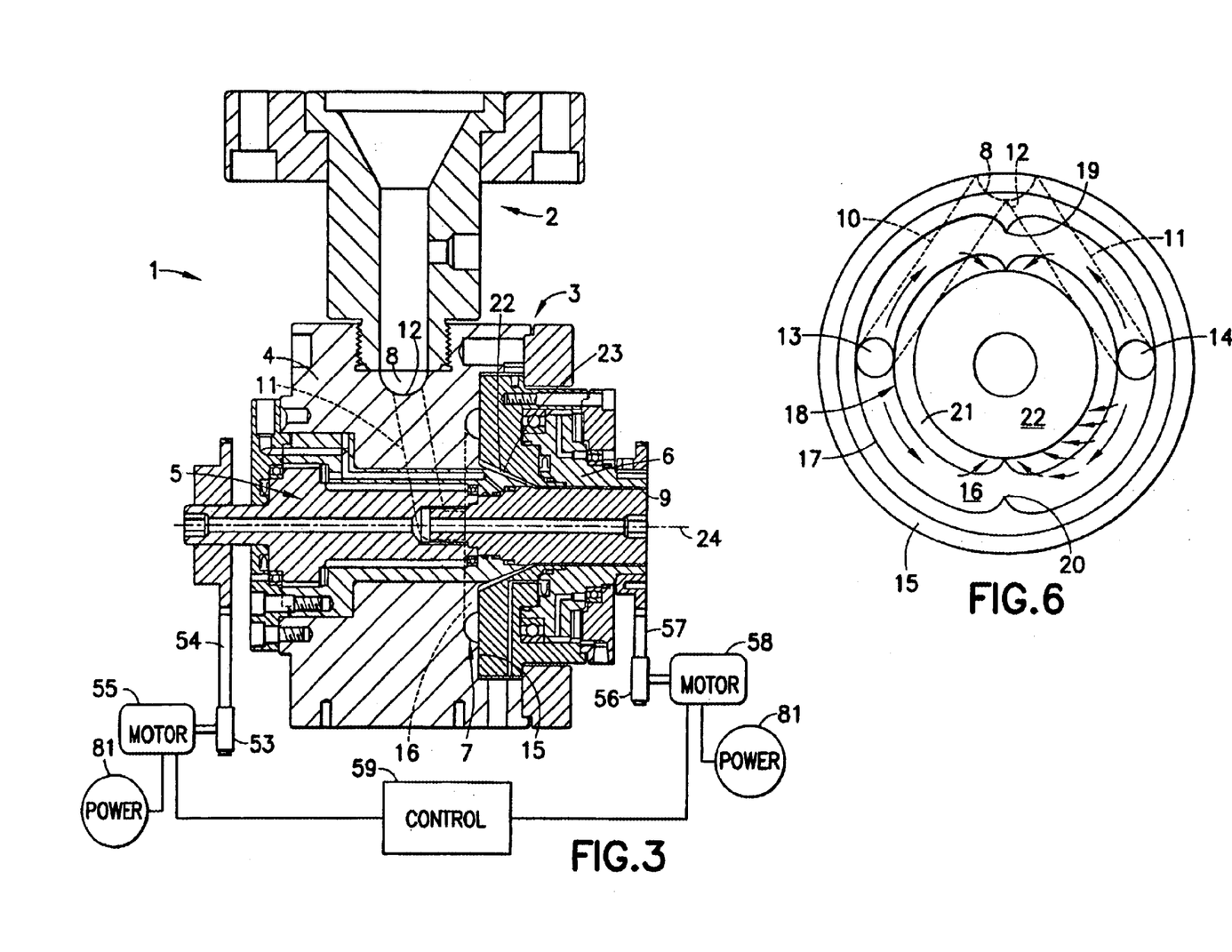
FIG. 3 is cross sectional view of an extrusion system having rotating modules.
FIG. 6 is an end view of the die body of the extrusion die system of FIG. 3.
Figure 4:
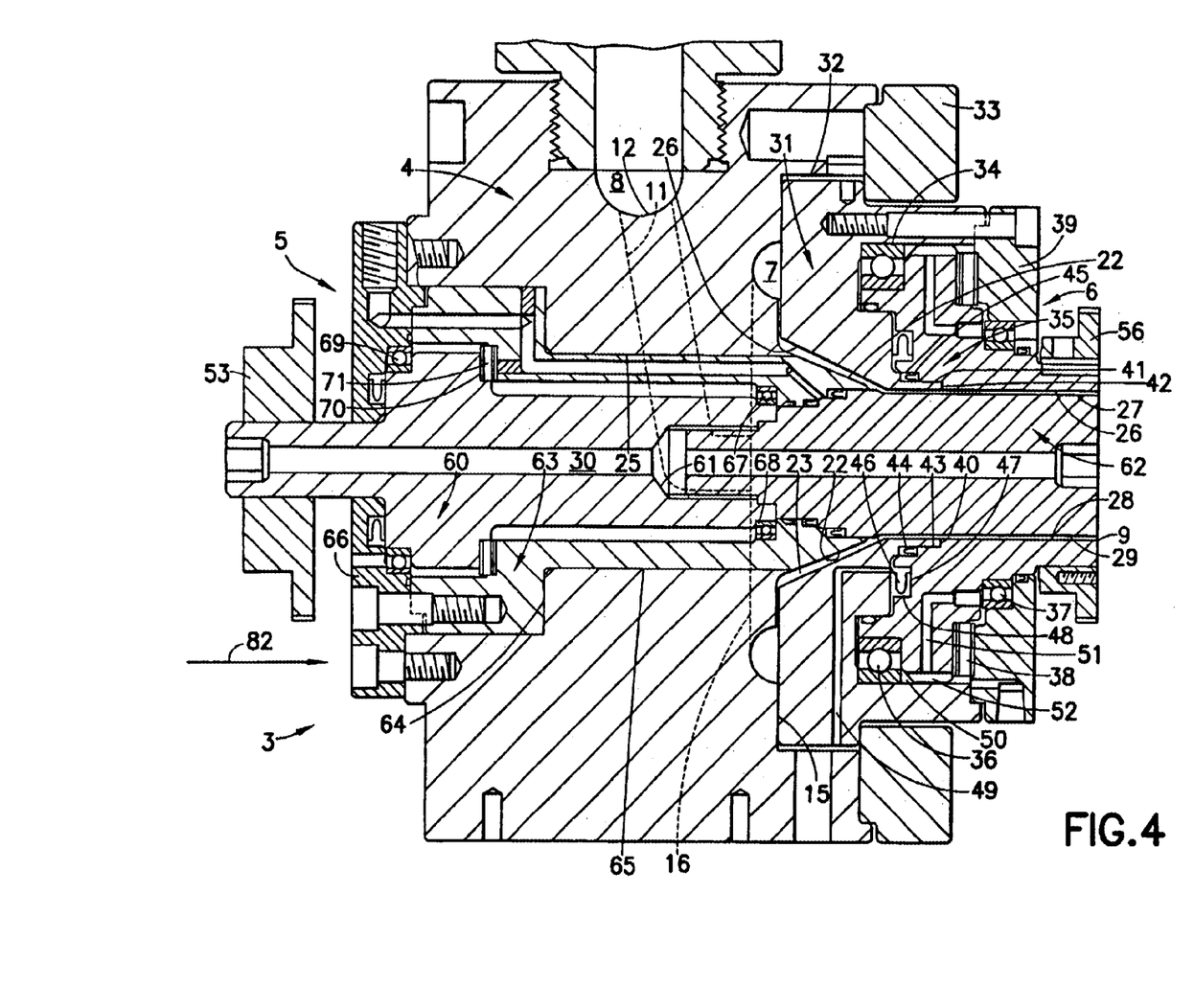
FIG. 4 is cross sectional view of the rotating elements of the extrusion die system of FIG. 3.
Figure 5:
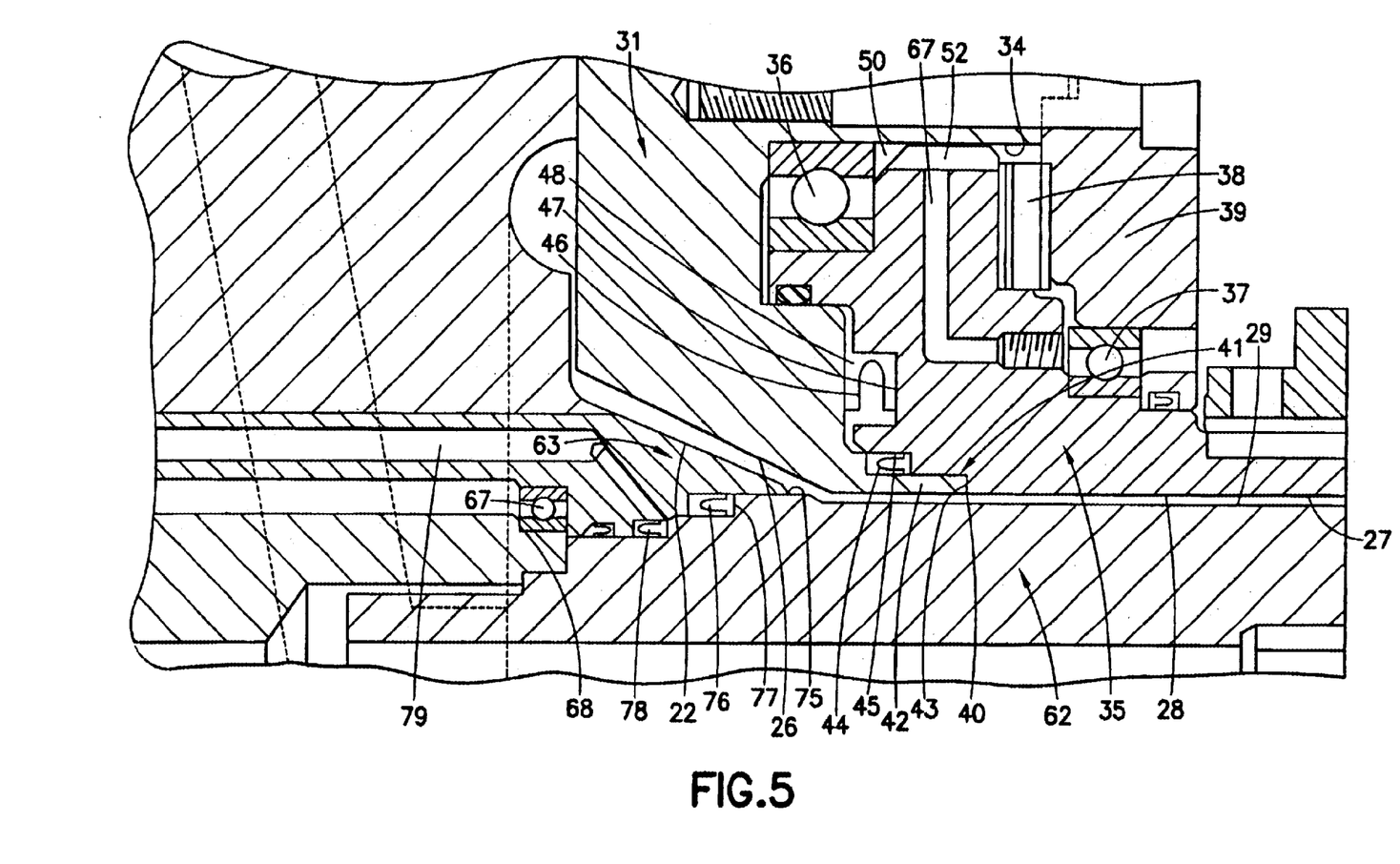
FIG. 5 is an enlarged cross sectional view of the bearing and seal system for the downstream rotating components of the extrusion die system of FIG. 3.

The extrusion system 1, illustrates an assembly of components designed to provide rotating extrusion surfaces and is shown in FIGS. 3 through 5. Extrusion system 1 is constructed to extrude a tubular product constructed of common thermoplastic materials. The system 1 includes an extruder 2 designed to provide molten plastic to an extrusion die 3. The extrusion die 3 consists of a series of components including a die body 4, and a die module 6. For ease of reference, the invention will be described with reference to the general axial flow of plastic from the upstream inlet to the downstream exit in the direction of arrow 82 of FIG. 4. When assembled, the extrusion die 3 of these components is constructed having a passage 7 therein extending from an upstream inlet 8 to a downstream outlet 9. The passage 7 is formed by the cooperation of adjacent components and the individual components of the passage communicate to provide a continuous passage 7 for the flow of molten plastic through the extrusion die 3. This passage is constructed to provide a balanced flow of plastic to and throughout an extrusion channel 23 which is formed downstream, as described below.

The flow passage 7, as shown in FIGS. 3 and 4, includes inlet 8, which receives molten plastic from an extruder 2. Flow channels 10 and 11 are connected to inlet 8 and a divider 12 separates the incoming stream of plastic evenly into the two channels. Flow channels 10 and 11 are constructed in the die body 4 and extend through the die body 4 to outlets 13 and 14 respectively, in the transversely oriented downstream face 15 of die body 4. A distribution groove 16 is formed in the downstream face 15 between an upstream edge 17 and a downstream edge 18. The distribution groove 16 communicates with the outlets 13 and 14 to receive molten plastic from the flow channels 10 and 11. The distribution groove 16 is substantially semicircular in cross section and extends in an annular manner concentric with the axis 24 of the extrusion die 3.

As shown in FIG. 6, the flow of plastic will be around the distribution groove 16 from each of the outlets 13 and 14. The flow will be in two opposing paths within the groove 16. Positioned symmetrically in the groove 16, equidistant from the outlets 13 and 14, are a pair blending wedges 19 and 20. Blending wedges 19 and 20 are contoured to encourage the movement of plastic towards the downstream edge 18. The downstream edge 18 consists of an extended flat land 21 which merges into a conical surface 22 constructed as described below. To enhance distribution of the plastic within the distribution groove 16, the land 21 is constructed with increased width or height in the vicinity of the incoming plastic. This promotes a flow as indicated by the arrows in FIG. 6. The land 21 diminishes in width or height in each direction away from the outlets 13 and 14. The plastic will therefore be distributed evenly over the downstream edge 18 and provide an likewise balanced flow within the extrusion channel 23.

The die body 4 and die module 6 are constructed with axially extending bores 25 and 26 respectively which align to form a continuous opening along the axis 24 of the extrusion die 3. A tip module 5 is constructed to fit within the bore 25/26. A clearance is formed between the inner surface of the bore 26, and the outer surface of the tip 5 to form the extrusion channel portion 23 and the exit portion 27 of the plastic passage 7. As shown best in FIG. 4, the conical surface 22 is constructed on the outer surface of the tip module 5 and cooperates with a conical portion of the bore 26 to form the tapered extrusion channel 23. The tip 5 may be constructed with an axial bore 30 to allow an elongated element to pass through the die for coating. The extended exit 27 is formed by the cooperation of surface 28 on die module 6 and surface 29 of the tip module 5.

It is desired, in accordance with this invention, to provide relative rotational movement between the surfaces 28 and 29. Before discussing the mechanical details of this function, it is necessary to describe the environment to which these moving parts are exposed. First the molten plastic is a significant source of heat and may cause the rotating components to obtain a temperature of up to 450° F. In addition the extruder 2 supplies the plastic at a substantial pressure which will rise as the plastic is forced through the extrusion die 3. The rotating components will experience pressure in excess of 5000 psi. To maintain the rotational capability of the extrusion die 3 under these conditions is not a simple matter. The uneven expansion of the parts may cause the parts to bind and stall the rotation. The pressures will promote leakage at every opportunity. In order to accomplish the rotational function, a unique bearing and seal system is constructed. This support system is described below.

As best shown in FIG. 5, the die module 6 consists of a die holder 31 which is assembled within recess 32 in die body 4 and held in place by a collar 33. The collar 33 may be bolted to die body 4. A die holder recess 34 is formed in the downstream face of the die holder 31 and is shaped to receive the die element 35. The die holder 31 is constructed with an axial conical bore which forms a portion of the bore 25/26. Inner surface 28 of the conical bore 26 mates with surface 22 of the tip module 5 to form the extrusion channel 23. The die holder 31 is fixed within the recess 32.

Figure 8:
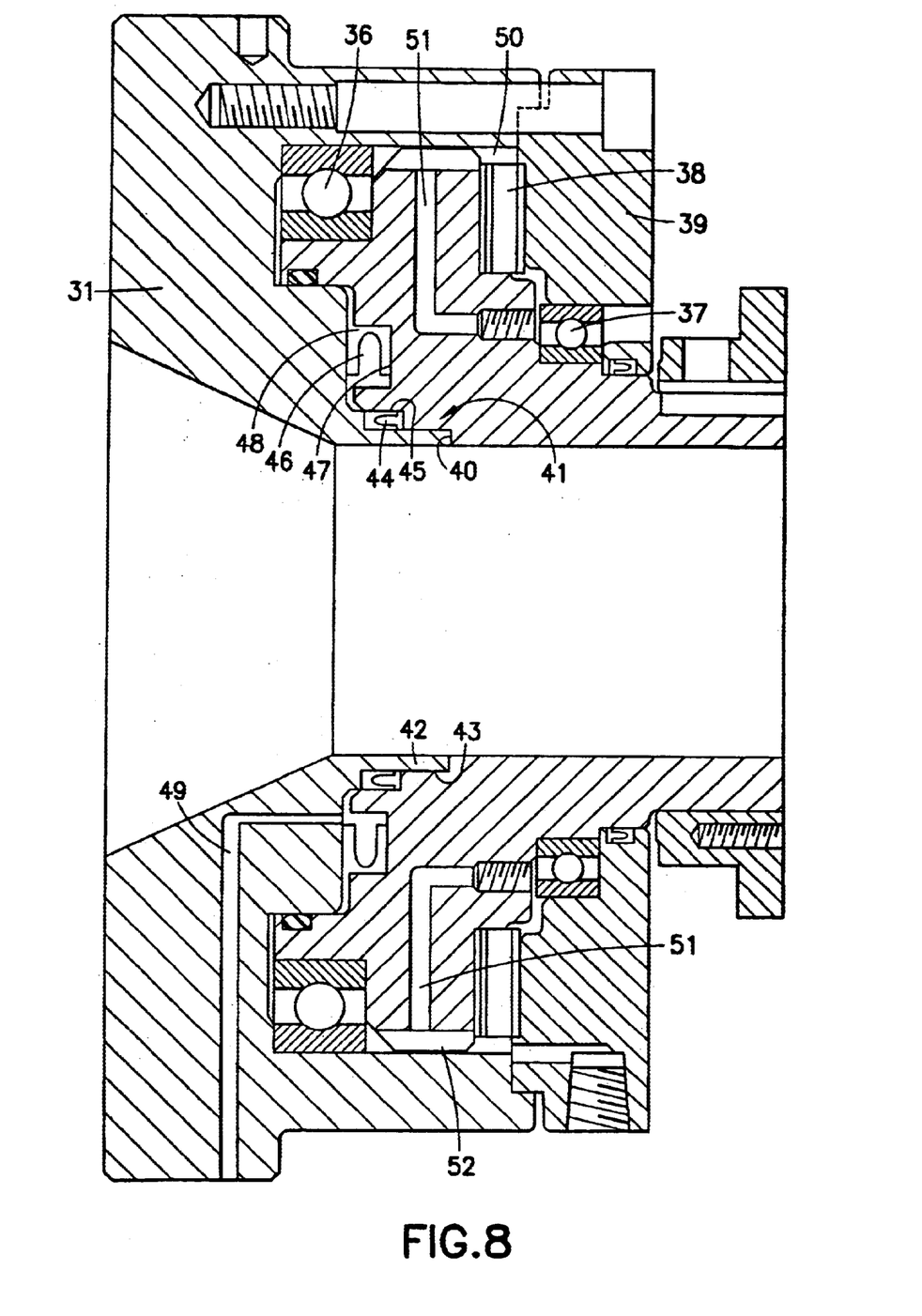
FIG. 8 is a cross section of the extrusion system of this invention showing the die bearings and seals.

Die element 35 is mounted for rotation within the recess 34 of die holder 31. As best shown in FIG. 8, in order insure reliable rotation, the die 35 is mounted on a pair of radial bearings including upstream bearing 36 and downstream bearing 37. Because of the need to continuously operate the die system 1 with the rotating components under substantial pressure, a thrust bearing 38 is used to control thrust loads. The die element 35 and its associated bearings are held in the assembled position by a collar 39 which may be bolted to the die holder 31. Although it would be possible to mount the die element 35 directly to the die body 4, it is preferable to use the die holder 31 to facilitate repairs, component replacement, or the use of alternative size or shape dies.

The rotational mounting of the die element 35, creates an undesirable leakage path for the plastic at the interface 40 between the die element 35 and the die holder 31 which is best shown in FIG. 8. Because of the high pressure this leakage path will require a unique seal configuration. The primary seal 41 absorbs the majority of the pressure drop required and consists of a labyrinth type arrangement utilizing the steel to steel 9 interface 40. The seal 41 consists of an annular shelf 42, formed at the interface of die holder 31, which mates with an oppositely shaped recess 43, machined into the interface of die element 35. It has been found that, the combination of the perpendicular turn created by the shelf 42 and the use of close tolerances, provides an effective primary seal for the pressures involved. A slight clearance is provided in the seal 41 to allow the plastic to infiltrate and such infiltrated plastic provides a bearing surface for the rotating parts.

The remaining pressure drop may then be absorbed by the annular face seal 44. The face seal 44 is mounted in a space created upon the engagement of the die 35 and holder 31 by the annular flat 45 machined on the interface 40 of die 35. In this manner an effective primary seal is created by the cooperation of the labyrinth seal 41 and the face seal 44.

A back up face seal 46 is also inserted at the interface 40. The seal 46 is positioned to bias the die 35 in the axially downstream direction. This bias serves to provide the necessary preload force for the proper operation of the thrust bearing 38. The secondary seal compartment 48 is constructed by the machining of a rectangular shaped annular groove 47 in the interface 40 of the die 35. Compartment 48 provides an overflow reservoir in the event of a failure of the primary seals. A sensing passage 49 (see FIG. 4) is drilled into the die holder 31 to communicate with an appropriate pressure sensor (not shown) external to the die 3 to provide a warning in the event of a pressure build up in the secondary seal compartment 48. Excessive pressure in the compartment 48 could trigger an audible alarm or signal the extrusion system to shut down. The seal and bearing system for the rotating die element 5, therefore, provides an interactive assembly of parts.

The bearings are contained within a closed lubrication bath which includes the annular chamber 50. A high viscosity oil is used to withstand the high temperatures and circulates within the bath through the oil passage 51 and chamber 50. A series of fins 52 are constructed on a circumferential face of the die element 5 extending into the annular chamber 50. Oil which falls by gravity to the lower portion of the chamber 50 can be circulated by the wiping action of the fins 52 within the chamber 50 as the die 35 rotates. As a further design concession to the high temperatures and pressures, the bearings and bearing races used in the system are coated with a material such as DICRONITE to form a durable operating surface.

The tip or pin module 5 consists of an assembly of three parts to facilitate the repair, replacement or overhaul of the components. An upstream tip portion 60 is constructed with a central bore 30. The bore 30 of the tip portion 60 expands into a threaded recess 61 at its downstream end to receive the downstream tip portion 62. Downstream tip portion 62 is axially aligned with the portion 60 and threads into the recess 61. Tip portion 62 is also constructed with an axial bore to form a continuation of the axial bore 30. Tip portions 60 and 62 are mounted for rotation within tip holder 63. Tip holder 63 is bolted within upstream facing recess 64 constructed in the die body 4. Tip holder 63 has a conical surface 22 which mates with the conical surface of the bore 26 in the die holder 31 to form the extrusion channel 23. The downstream section 29 of outer surface 65 of the downstream tip portion 63 is sized to provide a clearance with the corresponding surface of the die element 35. In this manner an extended cylindrical exit channel 27 is constructed communicating with the extrusion channel 23. As previously described, the channels communicate to provide a plastic flow passage 7 consisting of inlet 8, supply channels 10 and 11, distribution groove 16, extrusion channel 23, and exit channel 27. It is the surfaces 28 and 29, forming the exit channel 27 that are rotated relative to each other in accordance with this invention. Tip module 5 is held in place by end plate 66 which may be bolted to the die body 4.

Figure 7:
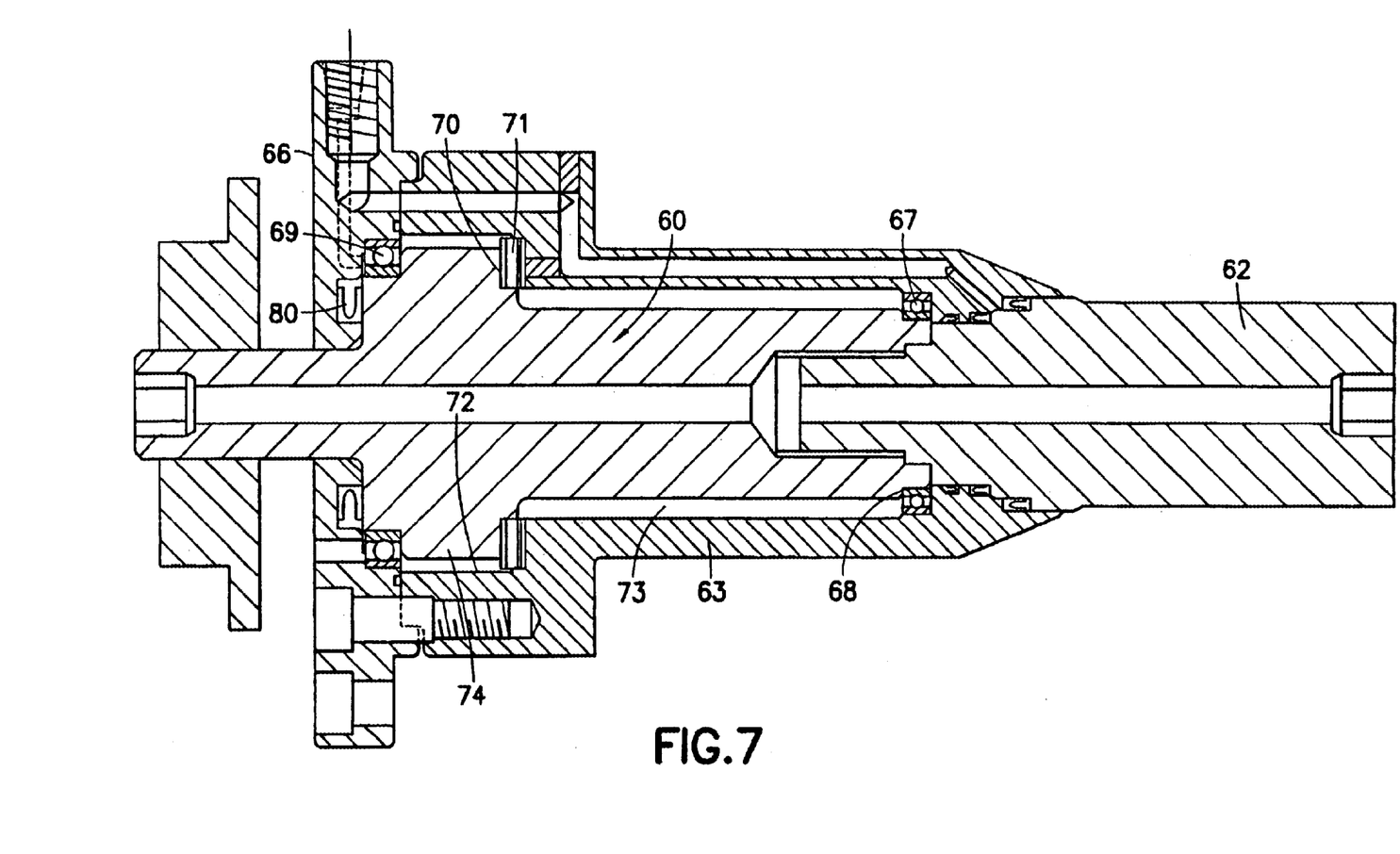
FIG. 7 is a cross sectional view of the extrusion die system of FIG. 3, showing the tip bearings and seals.

As best shown in FIG. 7, to mount the tip portions 60 and 62 for rotation within the tip holder 63, a configuration of bearings is provided which interact in a manner similar to the bearings 36, 37, and 38 of die module 6. A ring shaped radial bearing 67 is mounted in a cylindrical step 68 on the upstream end of tip portion 60. A second radial bearing 69 is mounted similarly at the downstream end of the tip portion 60. In an intermediate location, a downstream facing step 70 is machined into tip portion 60 to accommodate a thrust bearing 71. The thrust bearing 71 will respond to axial forces exerted on the tip portions 60/62. The bearings of the tip module 5 are contained in a closed oil bath consisting of a chamber 72 and annular passages 73. There is a requirement that the bearings be provided with a continuous flow of oil, however, with the pressures involved, the oil will tend to migrate away from the bearings. To counteract this, fins 74 are constructed on the outer surface of tip portion 60 and extend into the chamber 72. Again the wiping action of the fins 74 will circulate the high viscosity oil within the closed bath of the tip module 5.

A second leakage path occurs at the interface 75 of is the rotating components of the tip module 5. A primary seal is accomplished at the interface 75 by the face seal 76 installed on a cylindrical step 77 machined in the outer surface 65 of the downstream tip portion 62. A backup seal 78 is installed upstream of primary seal 76 on another cylindrical step. A sensing passage 79 is constructed in the tip holder 63 to enable an external sensor to sense the pressure at the backup seal 78. This will provide a signal in the event of a failure of the primary seal 76. At the upstream end of the upstream tip portion 60, another face seal 80 is installed and is held in place by the end plate 66. The face seal action against the end plate 66 will preload the thrust bearing 71. Again the seal system is designed to allow some leakage of material to infiltrate and provide a partial bearing surface for the tip module 5.

As shown in FIG. 3. The rotating parts of the extrusion die system 1 of this invention consist of the tip portions 60 and 62 and the die element 35. The tip portion 60 is operatively connected by a gear or pulley 53 through a belt 54 to a motor 55 which will impart rotary motion to the tip portions 60/62. Similarly the die element 35 is operatively connected through a gear or pulley 56, through a chain or belt 57 to a motor 58 which will impart rotary motion to the die element 35. The motors 55 and 58 are connected to an appropriate source of power 81.

The relative rotation of the surfaces applies a shear force to the material being processed and orients the material spirally about its axis. This results in increased strength and rigidity. The balanced flow insures a uniform product without any defects.

A computer 59 controls both motors 55 and 58 and is programmable to allow a wide variety of relative motions between the rotating surfaces 28 and 29. Under certain circumstances, it may be advantageous to limit the rotation to a periodic or alternating clockwise and counter clockwise motion through part of a complete rotation. The control system includes appropriate sensors to feed back actual rotational speed which can be compared with a predetermined rotational speed. In this manner the rotation or angular motion of the rotating surfaces 28 and 29 may be controlled independently. The computer 59 will also receive alarm signals generated by the pressure sensors to take appropriate steps in the event of excessive pressures in the leakage paths. As a further safety measure, the operating temperature of the die body 4 is monitored by the means of a thermocouple or other suitable sensor. To avoid damage to the rotating mechanisms, the computer will disable the rotational drive system until the die body 4 is up to a predetermined operating temperature. This insures that no solidified plastic residue will be present to bind the rotating parts as the drive motors are engaged.

The extrusion die assembly of this invention is subjected to considerable heat from the molten plastic and friction exerted by the rotating components. In addition the assembly includes auxiliary heat, such as cartridge heaters or fluid circulating heaters (not shown) to maintain the plastic material at a molten temperature. This heat causes problems for the bearings on which the rotating die element 35 and tip portions 60/62 are supported. The differing coefficient of expansion of the bearing material may cause the bearings to expand and bind the rotating modules. The bearings are carefully selected and coated for temperature durability as are the seals.

The supporting system for the rotating parts of this invention provide a heat resistance through the use of a highly viscous oil in an enclosed bath. The bath, being constructed with internal circulating means, insures a continuous supply of oil. The seal arrangement effectively eliminates leakage in spite of the adverse environment and works to provide preload forces to the bearings, while allowing the sensing of seal failures at critical points. The overall mechanism of this invention, therefore, provides an effective means by which rotation of the die elements can be accomplished.

The Balanced Flow Passage

Figure 9:
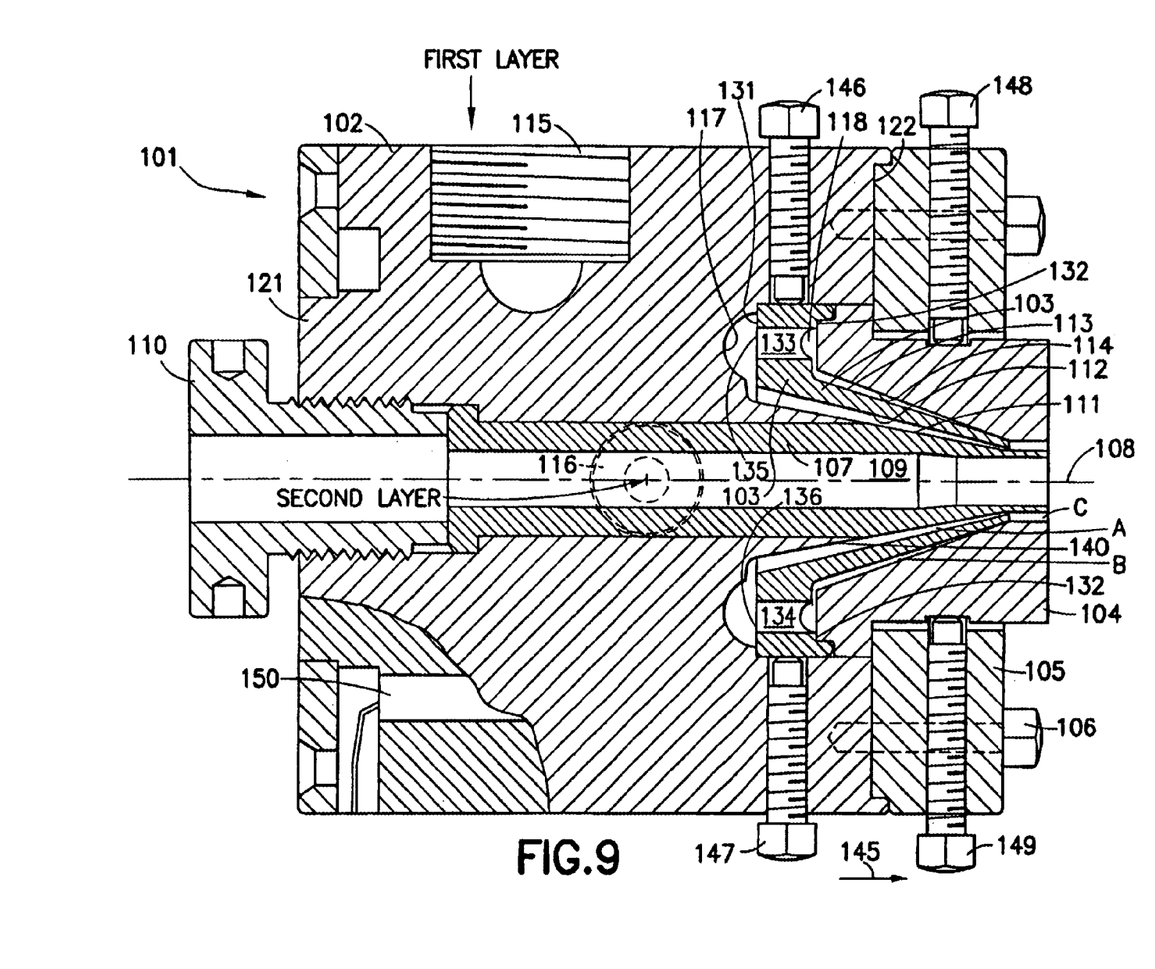
FIG. 9 is a sectional view through the axis of a die assembly showing a four component die system used to provide a double layered tubular product.
Figure 10:
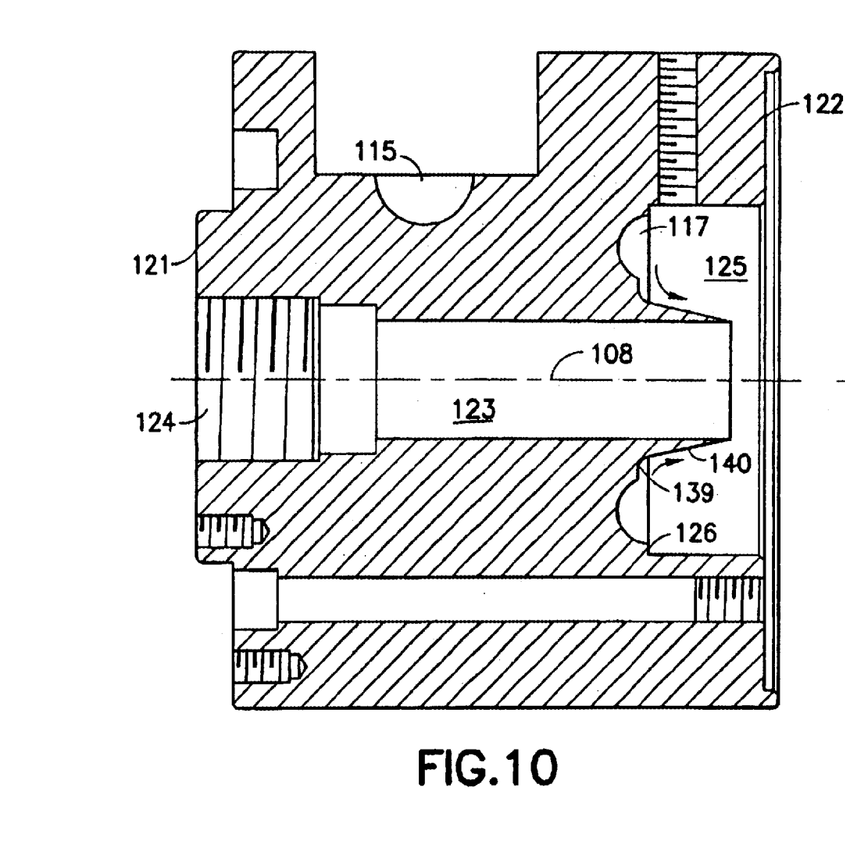
FIG. 10 is a sectional view of the die body of FIG. 9.

A balanced flow die assembly 101 is shown in FIG. 9 and consists of a die body 102, a tip die 103, die 104 and tip or core pin 107. The components of the die assembly are held in place by retainer ring 105 and bolts 106. Tip 107 is located on the axis 108 of the die assembly 101 and extends axially through the die assembly 101. Tip 107 is constructed with an axial bore 109 through which wire can be fed for receiving an extruded plastic coating or air can be forced to generate an extruded tubular product. Each component of the die assembly 101 has an axial bore which receives the tip 107. Tip 107 is held in place by tip bushing 110. Tip bushing 110 is constructed with an axially aligned bore which communicates with bore 109, thereby providing external access to the bore 109. The flow of plastic is generally from left to right through the die assembly 1, as shown by arrow 145 in FIG. 9. The tip 107 has a conically shaped mating surface 111 that, as shown in FIG. 9, cooperates with the conical surface 114 of the die 104 to form a first extrusion channel A for material for a first layer. The extrusion channel A is annular in shape and tapers radially inward in the downstream direction. As shown in FIG. 9, the die assembly 101 will apply a single layer coating on an element, such as a wire, which is drawn through bore 109.

In order to provide a two layer coating, a tip die 103 is inserted into the assembly 101 between the die body 102 and the die 104, as shown in FIG. 9. Tip die 103 is constructed with an upstream facing, interior conical surface 112 and an axially displaced, downstream facing, exterior conical surface 113. Upstream facing conical surface 112 cooperates with the downstream facing conical surface 111 of tip 107 to form the annular extrusion channel A. Downstream facing conical surface 113 of the tip die 103 cooperates with the upstream facing conical surface 114 of die 104 to form a second extrusion channel B for material for the second layer. Similarly, the extrusion channel B is annular in shape and tapers radially inward in the downstream direction. As shown, the components are generally of cylindrical shape and are axially aligned in the assembled condition. To assist in alignment of the components, adjustment screws 146, 147, 148, and 149 engage and support the tip die 103 and die 104, as shown in FIG. 9.

Figure 11:
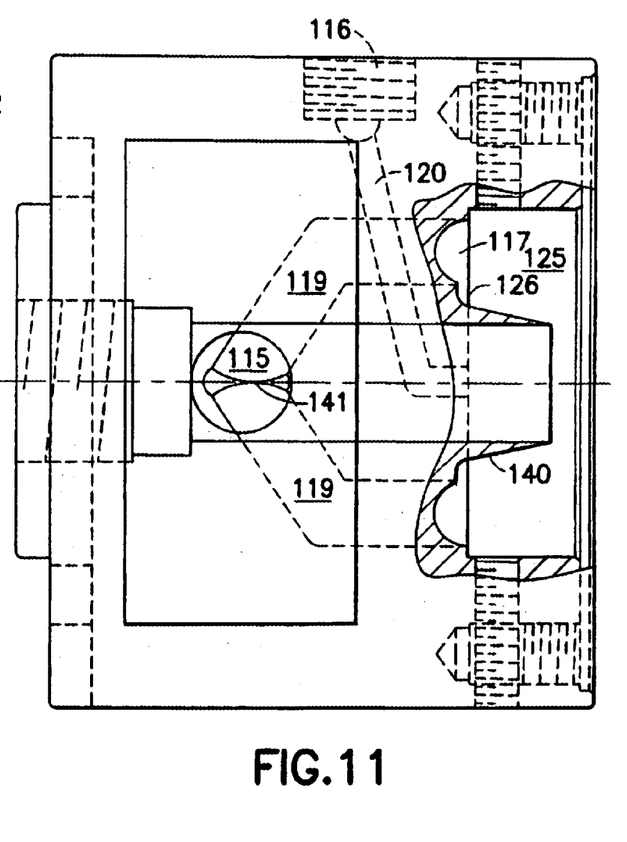
FIG. 11 is a side view of the die body of FIG. 9, showing the balanced flow passage.

As shown in FIG. 11, in accordance with this invention, extrusion channels A and B receive molten plastic through primary flow channels 119 and secondary flow channels 120 constructed in the die body 102. It will be observed that, in the configuration of FIG. 9, the flow channels 120 for extrusion channel B are closed by the die 104 for the purpose of single layer extrusion.

Die body 102 is shown in FIGS. 10 through 13 and is constructed to minimize the number of components required in the assembly. Die body 102 consists of a cylindrical member having a upstream end 121 and a downstream end 122. Bore 123 is constructed along axis 108 to receive tip 107. The entrance 124 to bore 123 is threaded to receive bushing 110. Inlets 115 and 116 are constructed in the outer surface of die body 103 to receive molten plastic for first and second layers. Downstream end 122 has a cylindrical recess 125 constructed to receive tip die 103 and die 104 and to hold these components in axial alignment. The bottom face 126 of the cylindrical recess 125 faces downstream and is constructed with a distribution groove 117 of a particular configuration to promote a balanced flow as described below.

Figure 12:
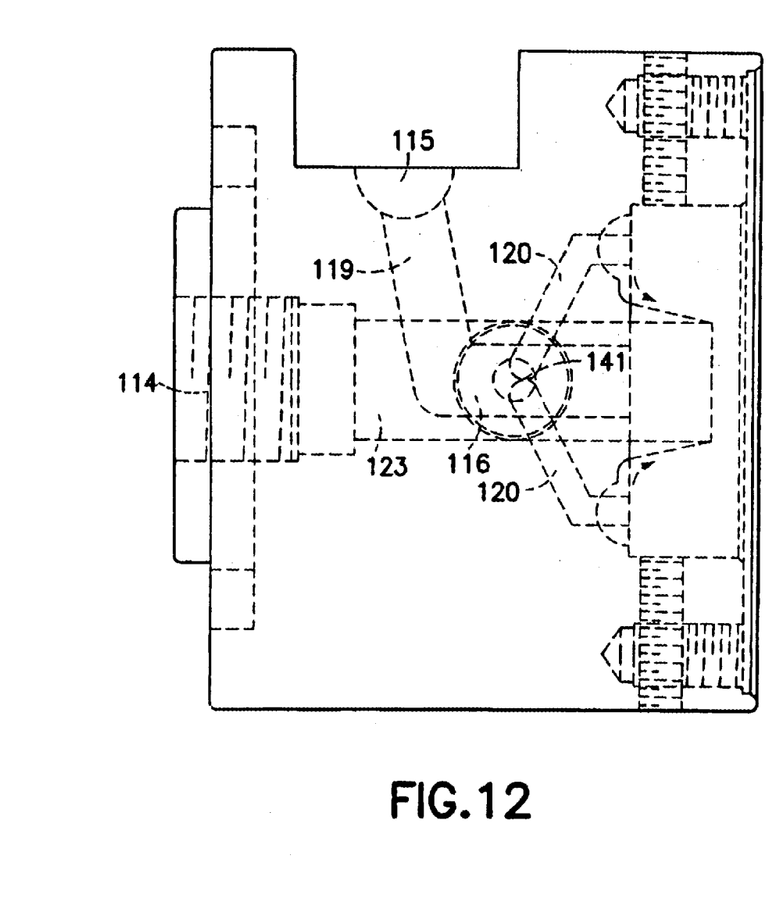
FIG. 12 is a top view of the die body of FIG. 9, showing the balanced flow passage.
Figure 13:
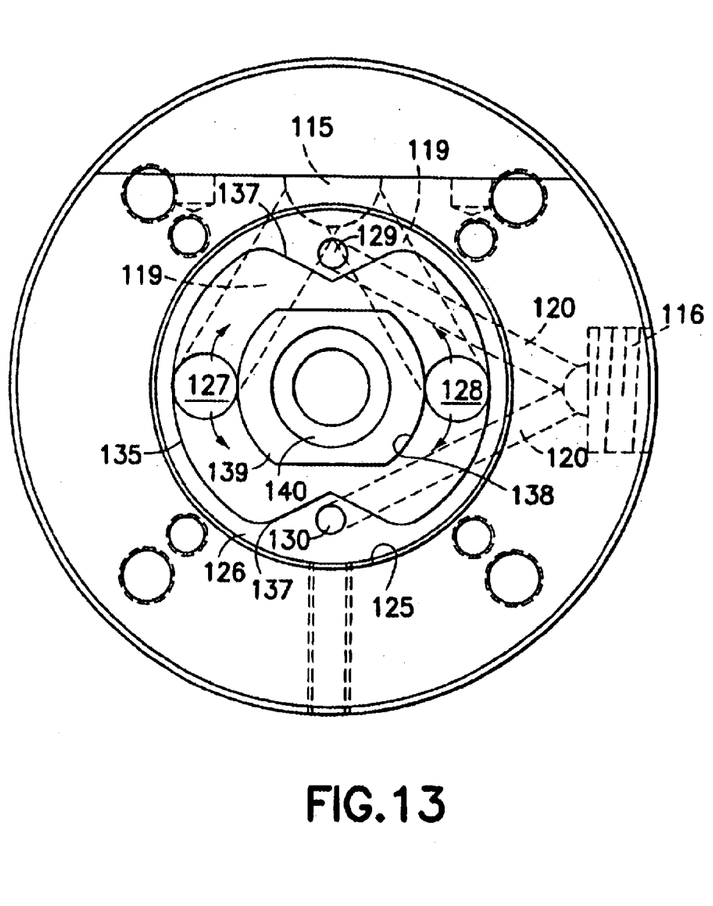
FIG. 13 is an end view of the die body of FIG. 9, showing the distribution groove.

As best shown in FIGS. 11, 12, and 13, a pair of flow channels 119 communicate with inlet 115 and extend to the outlets 127 and 128 to groove 117 to deliver molten plastic thereto. Groove 117 communicates with the extrusion channel A. A second pair of flow channels 120 communicate with the inlet 116 and the outlets 129 and 130 formed in the bottom face 126.

Figure 15:
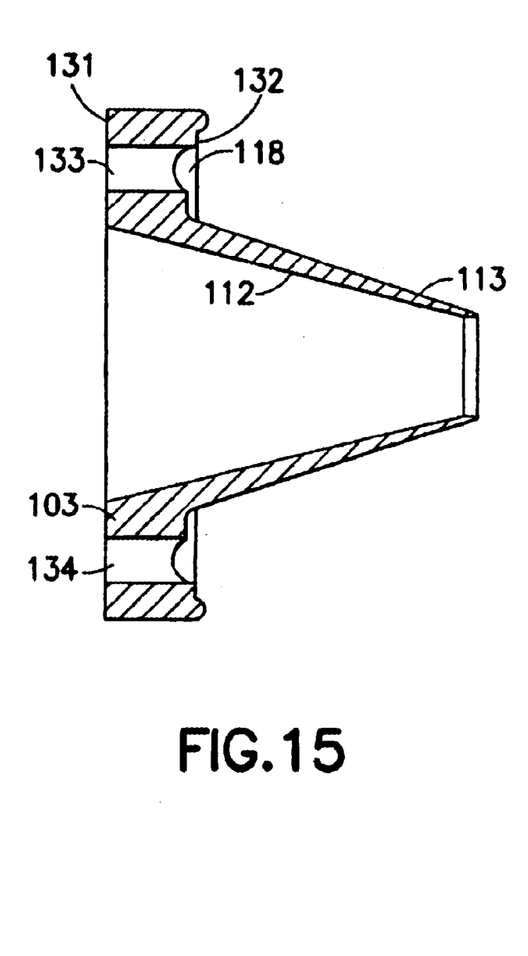
FIG. 15 is a side view of a tip die module used in the systems of the FIGS. 2, 9, and 14.
Figure 16:
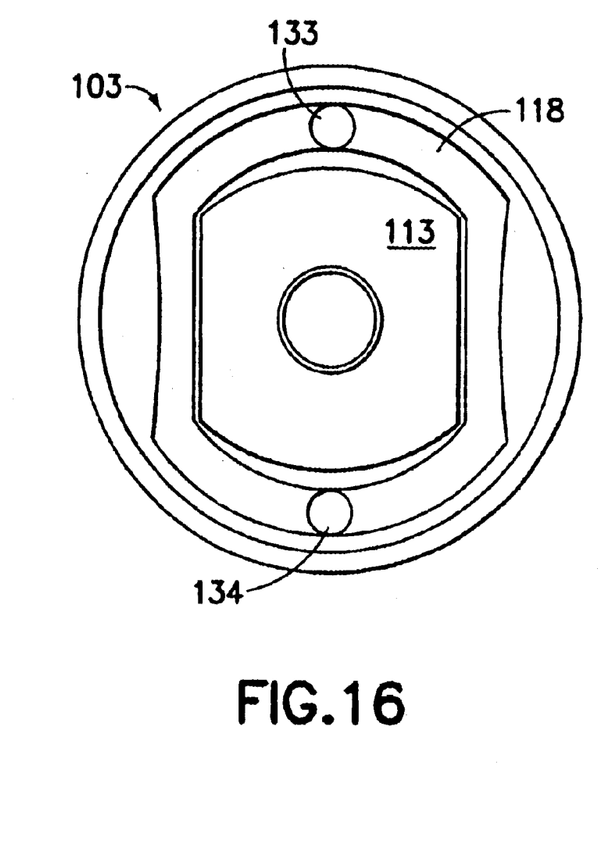
FIG. 16 is an end view of the tip die module of FIG. 15.

Referring to FIGS. 9, 15 and 16 tip die 103 is constructed with a radially extending flat surface 131, which merges with conical surface 112. Surface 131 engages the bottom face 126 of die body 102. A substantially parallel and coextensive surface 132 is constructed axially displaced downstream from surface 131 facing downstream. Surface 132 merges with the downstream facing conical surface 113 of the tip die 103. A second distribution groove 118 is constructed in the surface 132 and is similarly configured to distribution groove 117. Axially extending flow channels 133 and 134 are constructed having inlets 135 and 136 which align with the outlets 129 and 130 (as shown in FIG. 13) of the secondary flow channels 120 in die body 102 when the tip die 103 is assembled in the recess 125. Groove 118 receives molten plastic from outlets 129 and 130 and communicates with the extrusion channel B.

Extrusion channels A and B merge together to form a single exit channel C. The two layers of plastic material join at the juncture of channels A and B subject to the elevated temperature and pressure of the die. Material from channel B will be deposited around the circumference of the material introduced from channel A and the layered material will exit the die through channel C.

The proper operation of die assembly 101 requires that a balanced flow be maintained throughout. Accordingly, the die assembly 101 is constructed with a balanced flow passage starting with inlets 115 and 116 which receive molten plastic from extruders (not shown). Primary and secondary flow channels 119 and 120 communicate with inlets 115 and 116 respectively to deliver molten plastic to distribution grooves 117 and 118. Distribution groove 117 in die body 102 receives flowing plastic directly from flow channels 119 through outlets 127 and 128. Flow channels 120 communicate with the flow channels 133 and 134 to deliver molten plastic to groove 118 of the tip die 103. The flow channels 119 and 120 diverge to avoid intersection with the axial bore 123. To enhance the even distribution of plastic into both channels, a flow dividing wedge 141 is constructed at the junction of the two channels.

Distribution Grooves 117 and 118 have a substantially semi-circular cross section and are constructed in face 126 of recess 125 and face 132 of tip die 103 respectively and extend in a plain generally transverse to the axis 108 of the die assembly 101. Each groove has inlets positioned one hundred and eighty degrees apart to receive molten plastic. Each of the distribution grooves 117 and 118 are constructed similarly. Referring to distribution groove 117, as shown in FIG. 13, the groove 117 has an upstream circumferential edge 135 in which are constructed two symmetrically placed blending wedges 137 extending into the groove to encourage movement of molten plastic in the groove radially inward. The blending wedges 137 is arranged equidistant from the inlets 127 and 128. The downstream edge 138 of the groove 117 consists of a flat land 139 merging into the conical surface 140 which in turn merges with conical surface 111 of tip 107. To enhance the distribution function of the groove 117, the land 139 is constructed of diminished width and/or height in the area of the blending wedge 137, away from the inlets, so that the downstream edge 138 merges more directly into the conical surface 140 opposite the blending wedges 137 and operates to restrict the flow of plastic over the edge 138 in the vicinity of the inlets.

Flowing plastic is introduced to the groove 117 symmetrically by the flow channels 119. The plastic flow diverges in opposite directions around the groove 117 as shown by the arrows in FIG. 13. Since the downstream edge 138 is of lesser height than the upstream edge 135, an annular opening is formed. The molten plastic therefore flows over the edge 138 to the conical surface 140 as shown by the arrows in FIGS. 10 and 12. Because L of the extended width of the land 139 of the edge 138 in the vicinity of the inlets 136, plastic flow over the edge 138 is restricted at the inlet and the groove tends to fill with plastic. The flow extends evenly over the edge 138 to create an even distribution of plastic in the conical extrusion passage A. Blending wedges 137 tend to direct the flow of plastic into channel A over the land 139 at its thinnest area, first thereby allowing the distribution groove 117 to fill and further enhancing the balanced distribution of the molten plastic. Together the flow channels 119 and distribution groove 117 form a balanced flow passage for the first layer of plastic.

Similarly flow channels 120, 133 and 134 deliver molten plastic from inlet 116 to a second distribution groove 118 which is similar in structure to the groove 117 described above. The downstream edge of groove 118 merges with conical surface 113 which forms part of the extrusion channel B. In this manner a totally balanced flow of two streams of extruded plastic exit the extrusion channels A and B in channel C.

Figure 14:
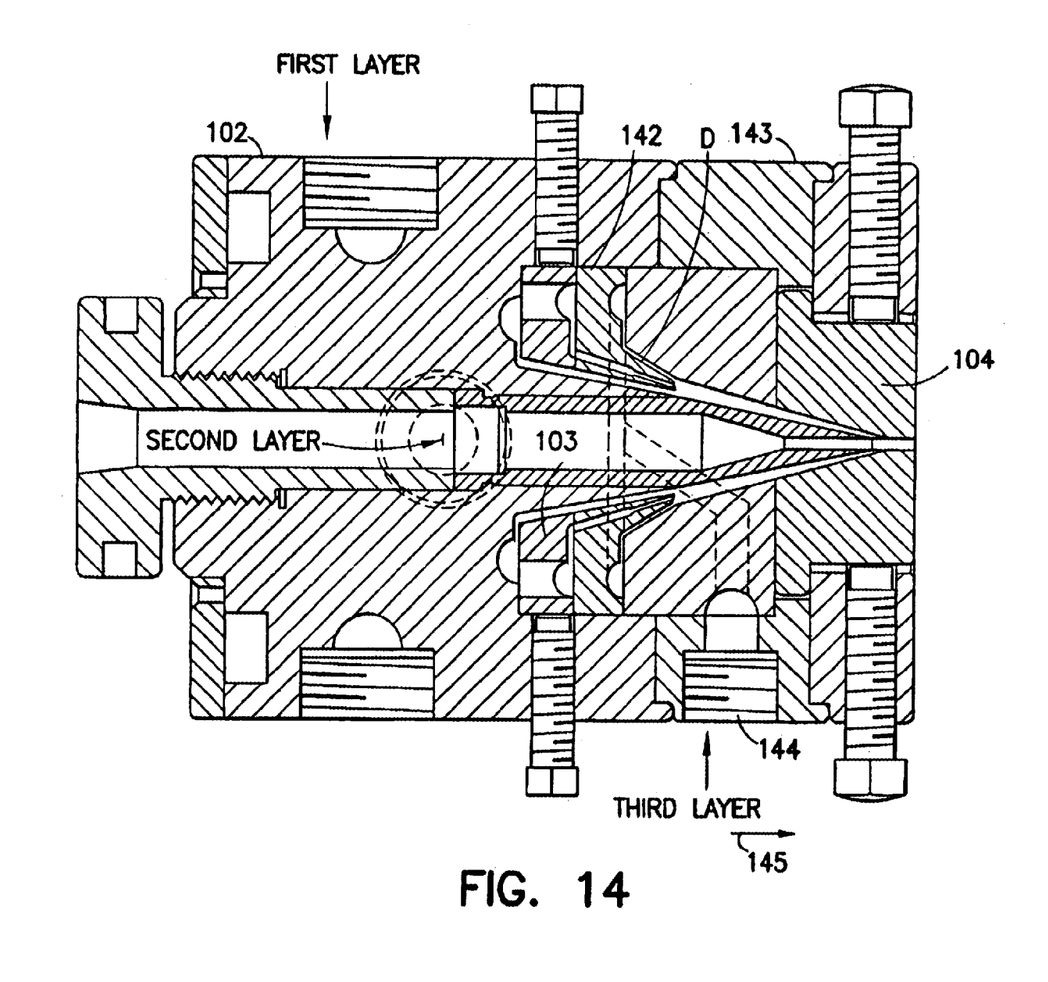
FIG. 14 is a sectional view, through the axis of an alternate embodiment of the die assembly of FIG. 9, used to provide a triple layered coating.

The structure of die body 102 can be combined with a wide variety of tip die and die designs to provide an almost infinite number of combinations, for example as shown in FIG. 14. Die assemblies which provide diverse functions from multiple layers to striping can now be formed from standard modular components.

FIG. 14 shows an example of a triple layer extrusion die assembly. In this embodiment, a supplemental tip die 142 is inserted between primary tip die 103 and die 104. A further flow channel insert 143 is used to provide an inlet 144 for plastic supplied to the third layer extrusion channel D.

We claim:

1. An extruded tubular article having a solid tubular wall portion, said wall portion comprising:
   a composite of at least two adjacent simultaneously extruded solid layers of thermoplastic flexible chain polymer, said extruded solid layers further comprising:
   at least one inner solid layer wherein a substantial number of polymer molecules in said layer form a helical pattern aligned at a first average angle with respect to a plane perpendicular to the longitudinal axis of the tubular article;
   at least one outer solid layer wherein a substantial number of polymer molecules in said outer layer form a helical pattern aligned at a second average angle with respect to said plane and wherein said first and second angles are different; and
   wherein said first and second angles are formed by subjecting said inner and outer layers to independent shear forces exerted by independently driven rotating surfaces.

2. A tubular article having a solid tubular wall portion, said wall portion, as described in claim 1, wherein the polymer is chosen from the group consisting of polystyrene and polyethylene.

3. A tubular article having a solid tubular wall portion, said wall portion, as described in claim 1, wherein said inner and outer layers our of different polymeric materials.

4. A tubular article having a solid tubular wall portion, said wall portion, as described in claim 1, wherein a solid tubular intermediate layer is applied between said solid outer and inner layers.

5. A tubular article having a solid tubular wall portion said wall portion, as described in claim 1, wherein the polymer is chosen from the group consisting of polystyrene and copolymers of styrene with butadiene and acrylonitrite (ABS resins); polyvinylchloride; polyolefins including polyethylene and polypropylene; polyesters including polyethylene terephthalate; polyketones; polyamides; thermoplastic elastomers.

* * * * *